United States Patent
Koo et al.

(10) Patent No.: US 7,269,145 B2
(45) Date of Patent: Sep. 11, 2007

(54) MODE TRANSITION METHOD FOR WIRELESS DATA SERVICE IN A MOBILE STATION

(75) Inventors: Chang-Hoi Koo, Songnam-shi (KR); Beom-Sik Bae, Suwon-shi (KR); Dong-Seek Park, Suwon-shi (KR); Dae-Gyun Kim, Songnam-shi (KR); Jung-Su Jung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1031 days.

(21) Appl. No.: 10/326,747

(22) Filed: Dec. 20, 2002

(65) Prior Publication Data

US 2003/0117969 A1   Jun. 26, 2003

(30) Foreign Application Priority Data

Dec. 20, 2001  (KR) .................. 10-2001-0082123
Jan. 4, 2002  (KR) .................. 10-2002-0000521

(51) Int. Cl.
  *G08C 17/00* (2006.01)
  *H04B 1/38* (2006.01)
(52) U.S. Cl. ....................... 370/311; 455/574
(58) Field of Classification Search ............ None
  See application file for complete search history.

(56) References Cited

U.S. PATENT DOCUMENTS

| | | | |
|---|---|---|---|
| 5,392,287 A * | 2/1995 | Tiedemann et al. | 370/311 |
| 6,289,228 B1 * | 9/2001 | Rotstein et al. | 455/574 |
| 6,339,588 B1 * | 1/2002 | Katsuragawa | 370/311 |
| 6,539,242 B1 * | 3/2003 | Bayley | 370/311 |
| 6,590,886 B1 * | 7/2003 | Easton et al. | 370/342 |
| 6,834,190 B1 * | 12/2004 | Lee et al. | 370/331 |
| 7,061,879 B2 * | 6/2006 | Oprescu-Surcobe et al. | 370/311 |
| 2001/0024431 A1 * | 9/2001 | Koo et al. | 370/335 |
| 2002/0173327 A1 * | 11/2002 | Rosen et al. | 455/518 |
| 2003/0040315 A1 * | 2/2003 | Khaleghi et al. | 455/435 |
| 2004/0013103 A1 * | 1/2004 | Zhang et al. | 370/345 |

\* cited by examiner

*Primary Examiner*—Chi Pham
*Assistant Examiner*—Anh-Vu Ly
(74) *Attorney, Agent, or Firm*—The Farrell Law Firm

(57) ABSTRACT

A mobile station in a control hold mode wakes up at a time slot on a wake-up channel received from a base station, assigned thereto, and detects at least one predetermined indicator bit. If the detected indicator bit indicates that the base station has data to transmit, the mobile station starts monitoring a forward packet data control channel from the base station, in order to determine whether to make a transition to an active mode. Otherwise, if the detected indicator bit indicates that the base station has no data to transmit, the mobile station maintains the control hold mode, thus preventing unnecessary power consumption.

12 Claims, 14 Drawing Sheets

MODE TRANSITION METHOD FOR WIRELESS DATA SERVICE IN A MOBILE STATION

PRIORITY

This application claims priority to an application entitled "Mode Transition Method for Wireless Data Service in a Mobile Station" filed in the Korean Industrial Property Office on Dec. 20, 2001 and assigned Serial No. 2001-82123, and an application entitled "Mode Transition Method for Wireless Data Service in a Mobile Station" filed in the Korean Industrial Property Office on Jan. 4, 2002 and assigned Serial No. 2002-521, the contents of which are incorporated herein by reference herein.

BACKGROUND OF THE INVENTION

1. Field of the Invention

The present invention relates generally to a mobile communication system, and in particular, to a method for performing mode transition (or state transition) for a data service in a mobile station.

2. Description of the Related Art

A typical mobile communication system provides only a voice service to a subscriber. However, with the development of the communication technology and at the request of users, studies have been carried out on a mobile communication system for supporting not only the voice service but also a high-speed data service for image communication and the Internet. A CDMA2000 (Code Division Multiple Access 2000) 1xEV-DV (Evolution in Data and Voice) mobile communication system supporting both the voice service and the data service includes a base station (BS) servicing a mobile station (MS), a subscriber terminal. The base station commonly separates circuit channels for the voice service and packet channels for the data service, and assigns, to the packet channels, the remaining radio resources except the radio resources used for the circuit (voice) channels. Here, the "radio resources" used in the base station include transmission power, the number of Walsh codes, and time periods (or time slots).

In the CDMA2000 1xEV-DV system, a forward packet data channel (F-PDCH) for a data service, transmitted from BS to MS, has data transmission periods and data non-transmission periods, which may irregularly occur due to a bust traffic characteristic of the data service. Therefore, the mobile station and the base station generally make a transition to a control hold mode (CHM) in the data non-transmission period, and then make a transition to an active mode (AM) if there is data to transmit. In the control hold mode, reverse channels and forward channels undergo gated transmission (or intermittent transmission). The gated transmission is one of the techniques proposed to save radio resources of the base station and minimize power consumption of the mobile station.

FIG. 1 is a message flow diagram illustrating an exemplary mode transition operation of a mobile station according to the background art. In FIG. 1, a forward common assignment channel (F-CACH) is assigned between a mobile station (MS) and a base station (BS), and monitored by the mobile station to make a transition from a control hold mode to an active mode. The base station transmits RAM (Resource Allocation Message) or RAMM (Resource Allocation Mini Message) over the F-CACH. The RAM or RAMM serves as a mode transition instruction message for instructing mode transition from the control hold mode to the active mode.

Referring to FIG. 1, the mobile station in the control hold mode continuously monitors the F-CACH while intermittently transmitting a reverse pilot signal and a reverse channel quality indicator over reverse channels R-PICH and R-CQICH to the base station. At this point, a forward fundamental channel (F-FCH) or a forward dedicated control channel (F-DCCH) for the data service is not assigned. Further, the base station in the control hold mode intermittently transmits PCB (Power Control Bit), information for forward power control, over a forward common power control channel (F-CPCCH). Here, "intermittent transmission (or gated transmission)" means that information is non-continuously exchanged between the base station and the mobile station at a predetermined gating rate. The gating rate is determined based on control messages exchanged between the base station and the mobile station before data communication is performed.

If there is data to transmit to the mobile station, the base station transmits RAM or RAMM with MAC_ID (Medium Access Control Identification), a unique ID of the corresponding mobile station, over the F-CACH, and then transmits an encoder packet (EP) size and a slot length of packet data to be transmitted, over F-SPDCCH/F-PPDCCH (Forward Secondary Packet Data Control Channel)/(Forward Primary Packet Data Control Channel). Thereafter, the base station transitions to the active mode and transmits data over F-PDCH. Upon receiving the RAM or RAMM with its MAC_ID from the base station over the F-CACH, the mobile station acquires the encoder packet size and slot length of the packet data by monitoring the F-SPDCCH/F-PPDCCH. Thereafter, the mobile station transitions to the active mode and decodes the data received over the F-PDCH. In the active mode, all gated information (reverse pilot signal, reverse channel quality indicator information, and PCB) are transmitted at a full rate.

However, in the conventional mode transition method of FIG. 1, the dedicated F-CACH must be allocated between the base station and the mobile station and continuously monitored by the mobile station, causing an increase in power consumption of the mobile station.

FIG. 2 is a message flow diagram illustrating another exemplary mode transition operation of a mobile station according to the background art. Referring to FIG. 2, in the control hold mode, only the F-SPDCCH/F-PPDCCH and not the dedicated F-CACH are allocated between the mobile station and the base station. In the same way as described in conjunction with FIG. 1, the mobile station in the control hold mode intermittently transmits a reverse pilot signal and a reverse channel quality indicator. However, contrary to FIG. 1, the base station in the control hold mode transmits the F-SPDCCH at a full rate, and the mobile station continuously monitors the F-SPDCCH.

If there is data to transmit to the mobile station, the base station transmits MAC_ID of the mobile station over the F-SPDCCH. Thereafter, the base station transitions to the active mode and then transmits data over the F-PDCH. Upon receiving its MAC_ID on the F-SPDCCH, the mobile station transitions to the active mode and then decodes data received over the F-PDCH to transmit HARQ(Hybrid Automatic Repeat request) ACK/NACK in response to the decoded data. The mobile station in the active mode transmits a reverse pilot and a reverse channel quality indicator at a full rate.

FIG. 3 is a flowchart illustrating an operation of making a transition from a control hold mode to an active mode by a mobile station in accordance with the message flow of FIG. 2. Referring to FIG. 3, in step 300, a mobile station in a control hold mode continuously monitors F-SPDCCH. In step 305, the mobile station decodes the F-SPDCCH and determines whether its own MAC_ID is detected from the F-SPDCCH. Upon failure to detect its MAC_ID, the mobile station returns to step 300. Otherwise, upon detecting its MAC_ID in step 305, the mobile station transitions, in step 310, to an active mode and starts receiving F-PDCH from a base station and transmits HARQ ACK/NACK in response to the received data. In step 315, the mobile station transmits R-PICH (Reverse Pilot Channel) and R-CQICH (Reverse Channel Quality Indicator Channel) at a full rate.

FIG. 4 is a flowchart illustrating an operation of making a transition from a control hold mode to an active mode by a base station in accordance with the message flow of FIG. 2. Referring to FIG. 4, if there is data to transmit to a mobile station, a base station in a control hold mode transmits MAC_ID of the corresponding mobile station over F-SPDCCH in step 400. Thereafter, in step 405, the base station transitions to an active mode and then starts transmitting packet data over F-PDCH. Subsequently, the base station transmits F-CPCCH (Forward Common Power Control Channel) at a full rate, in step 410. At this moment, PCB transmitted over the F-CPCCH is determined based on information intermittently received over R-PICH and R-CQICH for a reverse link.

However, even in the mode transition method described in conjunction with FIGS. 2 to 4, the mobile station must continuously monitor F-SPDCCH or F-PPDCCH in the control hold mode without perceiving presence of a mode transition message, thus causing an increase in power consumption of the mobile station.

SUMMARY OF THE INVENTION

It is, therefore, an object of the present invention to provide a method for performing mode transition between a control hold mode and an active mode for a data service in a mobile station and a base station.

It is another object of the present invention to provide a method for performing mode transition from a control hold mode to an active mode to reduce a waste of radio resources in a forward link.

It is further another object of the present invention to provide a method for performing mode transition from a control hold mode to an active mode to minimize power consumption of a mobile station in a reverse link.

To achieve the above and other objects, the present invention provides a method for determining, by a mobile station, whether a base station has data to transmit during a data service, where the mobile station is in a control hold mode in a data non-transmission period, and returns to an active mode in a data transmission period. The method comprises the steps of: detecting at least one predetermined indicator bit over at least one time slot on a forward wake-up channel, assigned to the mobile station in the control hold mode; monitoring a control channel from the base station in order to determine whether to transit to the active mode if the at least one indicator bit indicates that the base station has data to transmit; and returning to the active mode in order to receive data from the base station if a unique ID (Identification) of the mobile station is detected from the monitored control channel.

To achieve the above and other objects, the present invention provides a method for returning to an active mode to resume data transmission, by a base station in a control hold mode in a data non-transmission period where the base station transmits no data to a mobile station during a data service. The method comprises the steps of: setting at least one indicator bit on a forward wake-up channel, transmitted over at least one slot assigned to the mobile station, to a value indicating that the base station has data to transmit if there is data to transmit to the mobile station; and transmitting the indicator bit indicating that the base station has data to transmit, and then transmitting a unique ID (Identification) of the mobile station over a forward packet data control channel to the mobile station.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides a method for assigning a forward wake-up channel (F-WUCH) for instructing a mode transition, between a mobile station and a base station. The F-WUCH transmits a wake-up indicator (WUI) for indicating whether the mobile station should monitor a control channel. A mobile station in a control hold mode detects a predetermined indicator by continuously monitoring the F-WUCH. If the detected indicator indicates an instruction for monitoring a control channel, the mobile station wakes up, powers up a demodulation-related circuit, and then decodes the control channel.

In the control hold mode, the mobile station powers down an RF (Radio Frequency)-related circuit and a demodulation-related circuit, in order to prevent unnecessary power consumption. Herein, this mode will be referred to as a "sleep mode." A mobile station in the sleep mode wakes up just before a time slot previously assigned thereto comes, and detects a wake-up indicator. If the detected wake-up indicator indicates an instruction for monitoring a control channel, the mobile station powers up an RF receiver circuit and a demodulation circuit.

Figure 1:
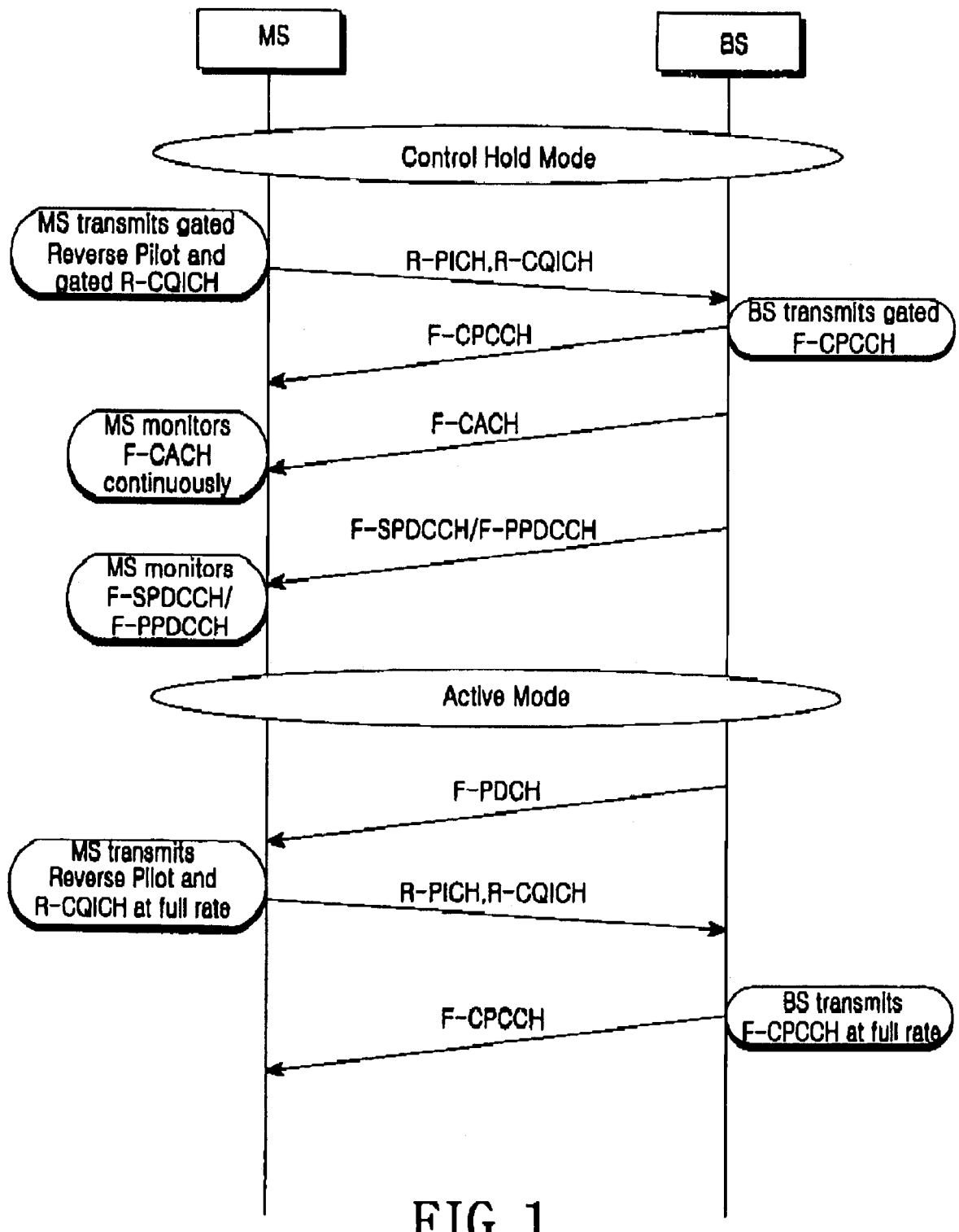
FIG. 1 is a message flow diagram illustrating an exemplary mode transition operation of a mobile station according to the background art.
Figure 2:
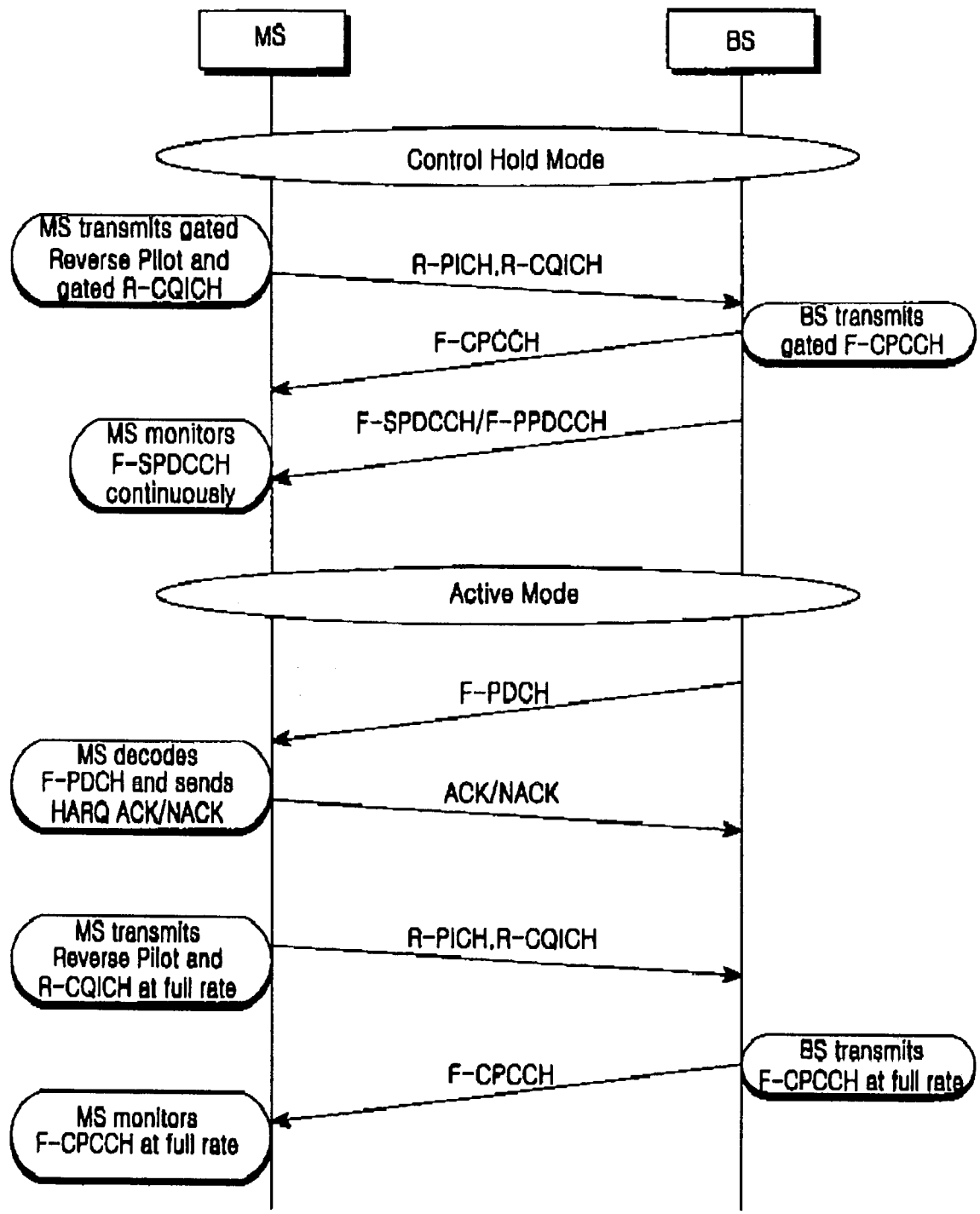
FIG. 2 is a message flow diagram illustrating another exemplary mode transition operation of a mobile station according to the background art.
Figure 3:
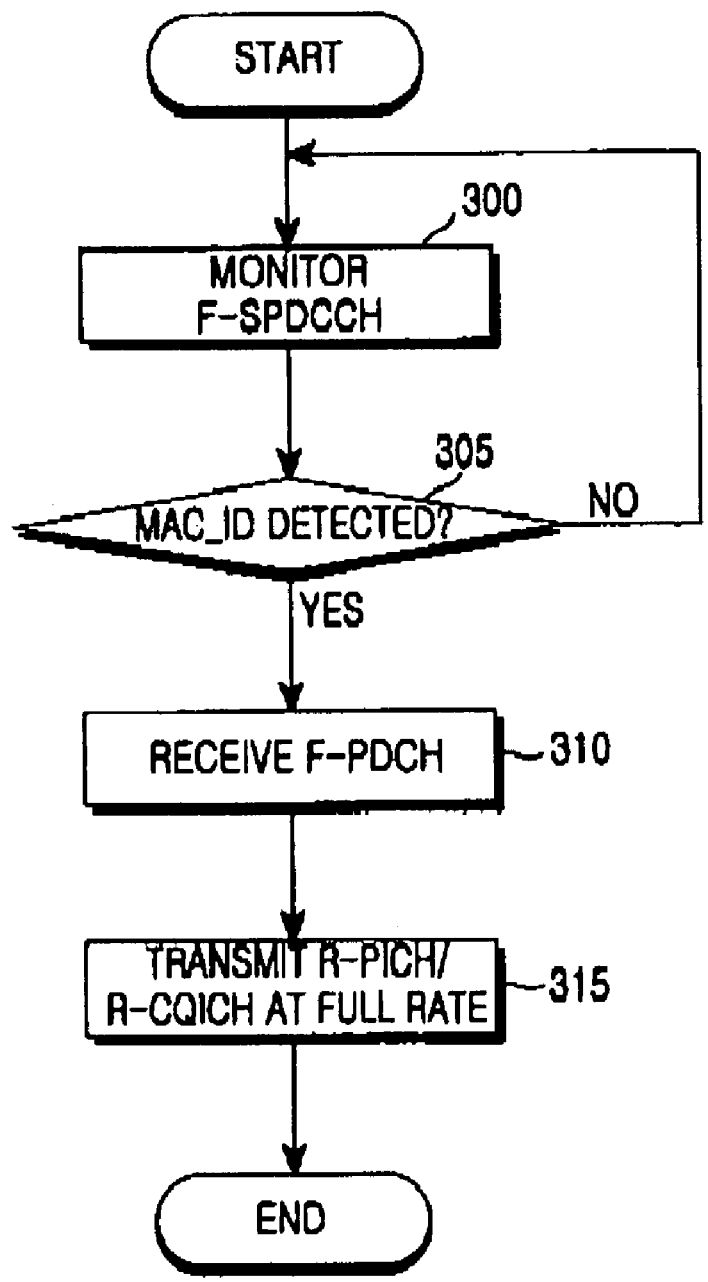
FIG. 3 is a flowchart illustrating an operation of making a transition from a control hold mode to an active mode by a mobile station in accordance with the message flow of FIG. 2.
Figure 4:
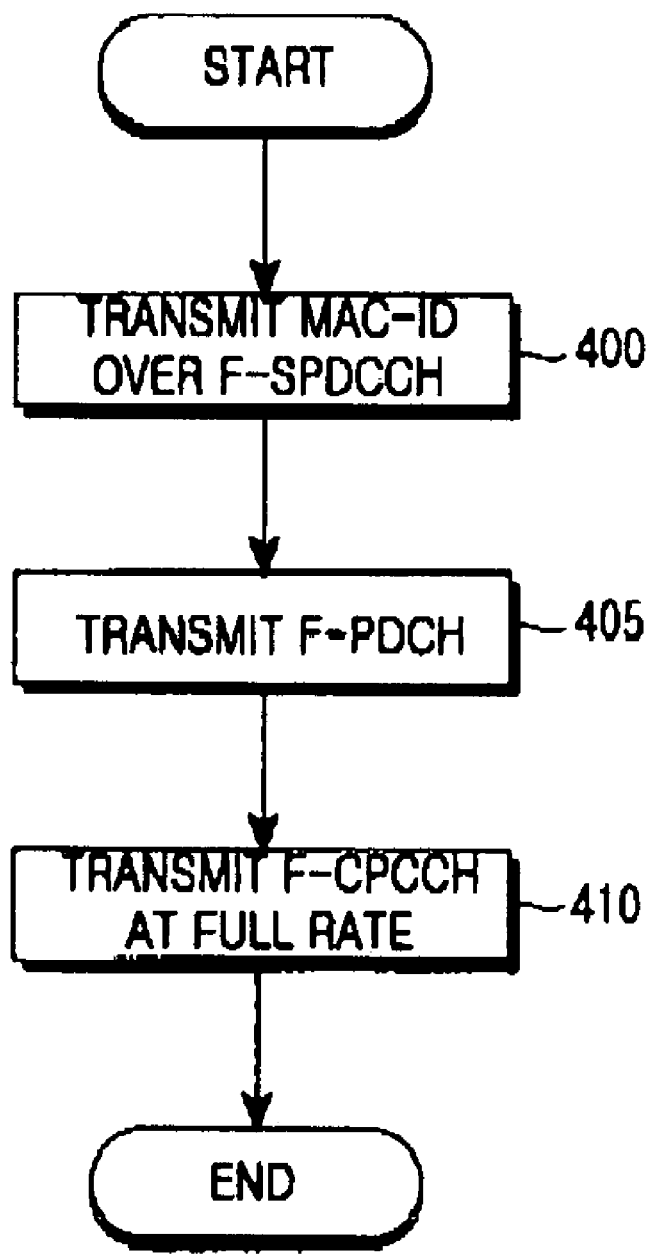
FIG. 4 is a flowchart illustrating an operation of making a transition from a control hold mode to an active mode by a base station in accordance with the message flow of FIG. 2.
Figure 5:
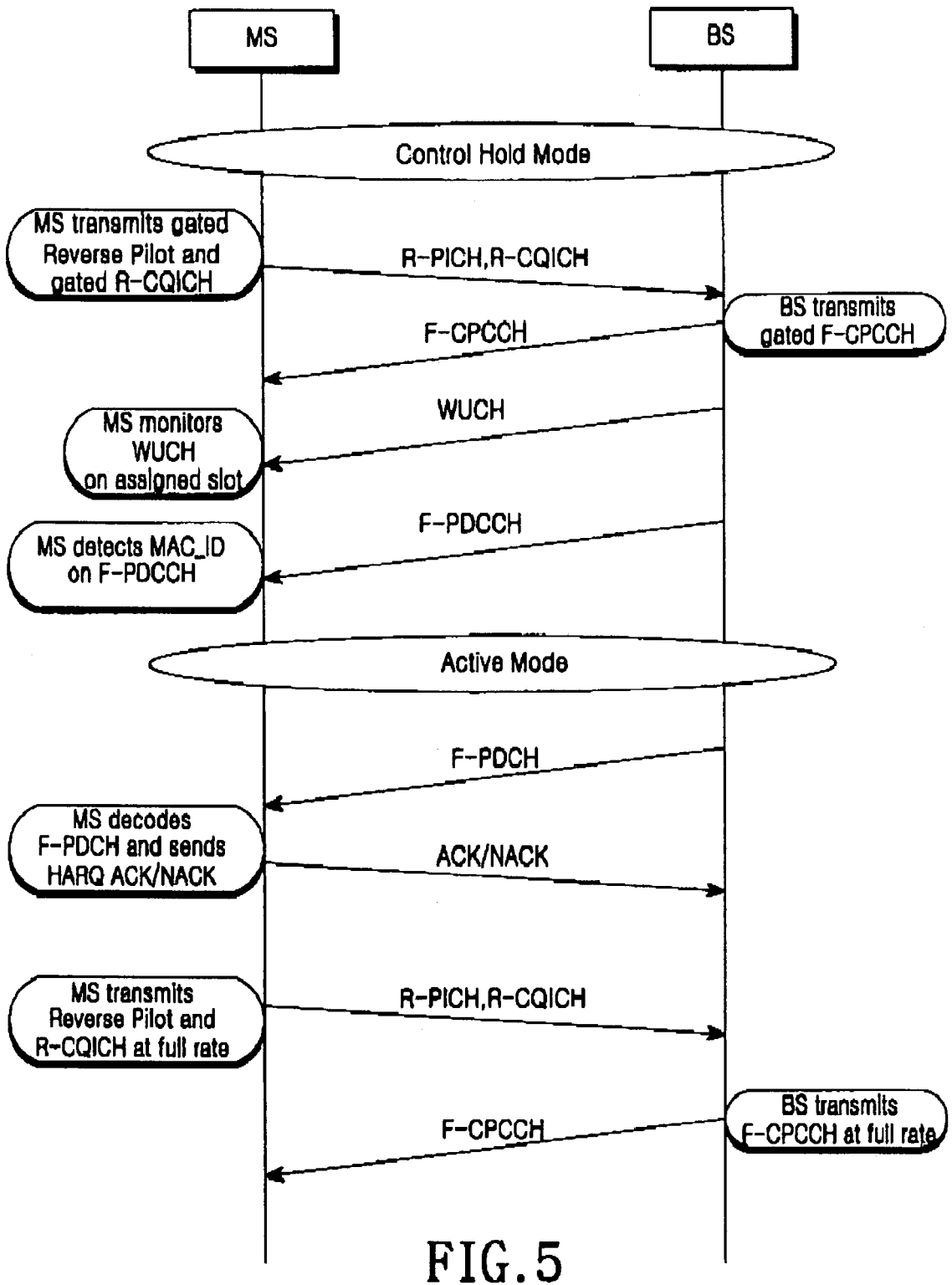
FIG. 5 is a message flow diagram illustrating a mode transition operation of a mobile station according to an embodiment of the present invention.

FIG. 5 is a message flow diagram illustrating a mode transition operation of a mobile station according to an embodiment of the present invention. Referring to FIG. 5, in a control hold mode, if there is data to transmit, a base station transmits a predetermined indicator to a mobile station at a full rate at a particular time slot of F-WUCH. The predetermined indicator indicates whether the mobile station should monitor a control channel, or F-PDCCH (Forward Packet Data Control Channel). That is, in the control hold mode, the mobile station operates in the sleep mode, and wakes up only at an F-WUCH slot assigned thereto to receive a predetermined indicator, and then monitors the F-PDCCH according to the received indicator.

More specifically, in the control hold mode, the base station intermittently transmits PCB (Power Control Bit) over F-CPCCH (Forward Common Power Control Channel). At this moment, if there is data to transmit to the mobile station, the base station transmits a predetermined indicator over an F-WUCH slot assigned to the corresponding mobile station, transmits MAC_ID (Medium Access Control Identification) of the mobile station over the F-PDCCH, and then makes a transition to an active mode to transmit data over F-PDCH (Forward Packet Data Channel). Here, the MAC_ID, information assigned to a mobile station at the start of a data service, is used to identify a mobile station in service.

In the control hold mode, the mobile station wakes up only at an F-WUCH slot assigned thereto, while intermittently transmitting a reverse pilot channel (R-PICH) and a reverse channel quality indicator channel (R-CQICH). Here, a position of the F-WUCH slot assigned to the mobile is determined during call setup for a data service between the base station and the mobile station. A detailed description of the slot position will be made later.

If no indicator is detected at the assigned F-WUCH slot, the mobile station returns to the sleep mode, and waits until the next assigned F-WUCH slot arrives. Otherwise, if an indicator is detected, the mobile station wakes up, and monitors the F-PDCCH. Upon receiving its MAC_ID over the F-PDCCH, the mobile station transitions to the active mode and starts receiving data over the F-PDCH and transmits HARQ ACK/NACK in response to the received data.

Figure 6:
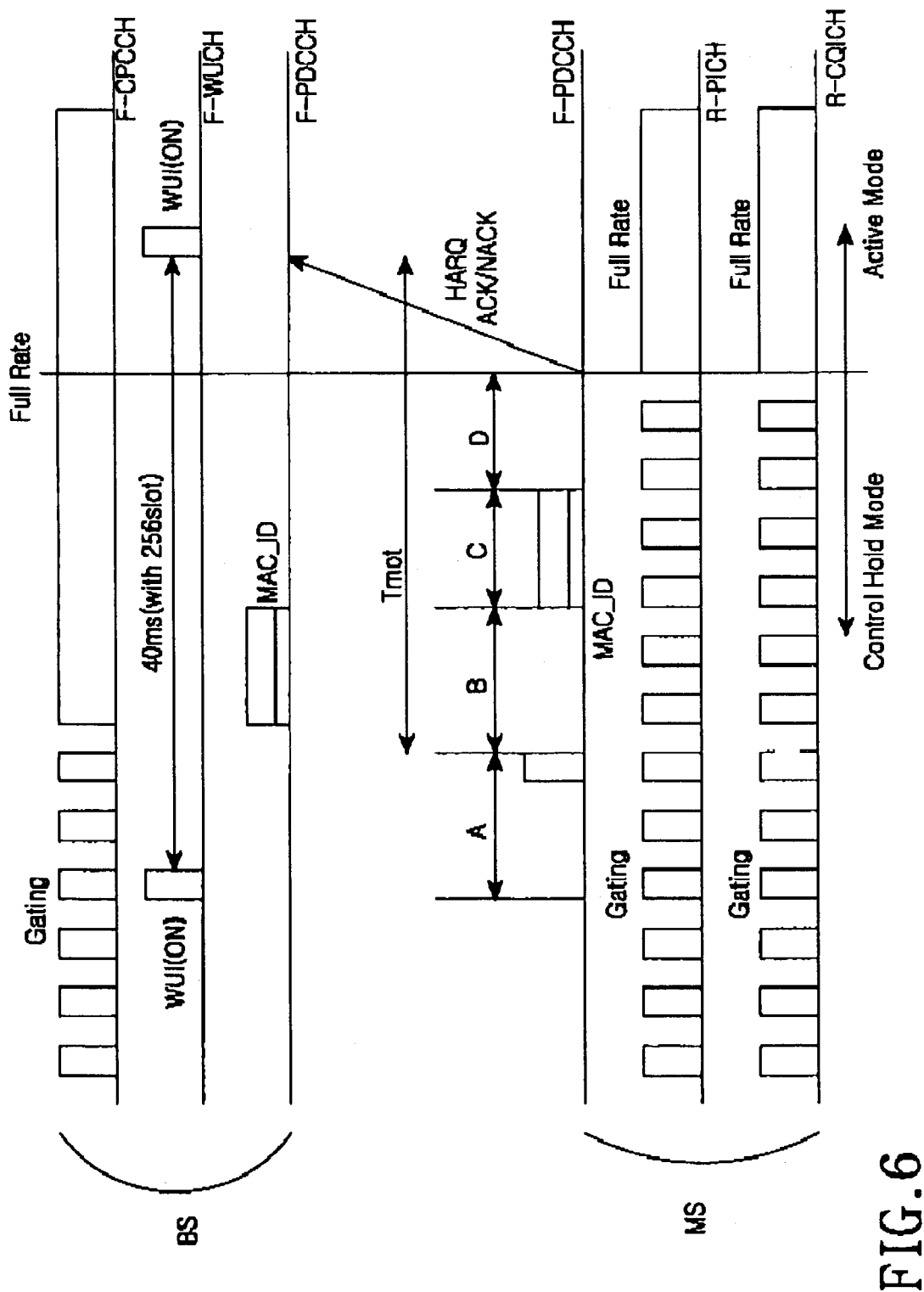
FIG. 6 illustrates channels used for a mode transition operation of a base station and a mobile station according to an embodiment of the present invention.

In the active mode, the mobile station transmits R-PICH and R-CQICH at a full rate, and the base station transmits F-CPCCH at a full rate FIG. 6 illustrates channels used for a mode transition operation of a base station and a mobile station according to an embodiment of the present invention. Although F-WUCH shown in FIG. 6 is comprised of a 40 ms frame having 256 slots, a frame length and the number of slots of the F-WUCH can be freely changed by the designer.

Referring to FIG. 6, in a control hold mode, a base station (BS) intermittently transmits F-CPCCH at a predetermined gating rate. The gating rate is determined according to a signaling message transmitted from a base station to a mobile station during a call setup procedure. If there is data to transmit to a mobile station, the base station transmits a predetermined indicator, or WUI, to the mobile station over F-WUCH. The WUI is transmitted at a slot previously assigned between the base station and the mobile station. Herein, for example, the F-WUCH transmits 1-bit WUI.

If the base station transmits WUI for a particular mobile station at a predetermined position (slot) of the 40 ms frame including 256 slots, then the mobile station detects the WUI transmitted at the previously assigned position (slot) of each frame. After transmitting WUI at the assigned F-WUCH slot, the base station transmits MAC_ID of the corresponding mobile station over F-PDCCH, and transmits the F-CPCCH at a full rate.

In FIG. 6, 'A', 'B', 'C' and 'D' represent time periods required until the mobile station receives its MAC_ID over F-PDCCH. That is, 'A' represents a time period required until the mobile station receives WUT over the F-WUCH and decodes the received WUT, and 'B' represents a time period required by the mobile station for acquiring synchronization of the F-PDCCH. Further, 'C' represents a time period required by the mobile station for decoding MAC_ID received over the F-PDCCH, and 'D' represents a time period required when the mobile station decodes data received over F-PDCH and transmits ACK/NACK (Acknowledgement/Non-Acknowledgement) in response to the received signal. In addition, Tmot represents a time period where the mobile station monitors the F-PDCCH.

As illustrated, in the control hold mode, upon receiving its MAC_ID while intermittently transmitting R-PICH and R-CQICH, the mobile station transitions to an active mode and transmits R-PICH and R-CQICH at a full rate while receiving data over the F-PDCH.

A procedure for transmitting a wake-up indicator (WUI) over F-WUCH according to the present invention will be described herein below. A wake-up indicator transmitted over F-WUCH can be made such that it has a very short length compared with a message transmitted over F-PDCCH. Preferably, the indicator is comprised of a single indicator bit, or comprised of two indicator bits to improve reliability.

First, a description will be made of a first embodiment where the WUI transmitted over F-WUCH is comprised of a single indicator bit.

Figure 7:
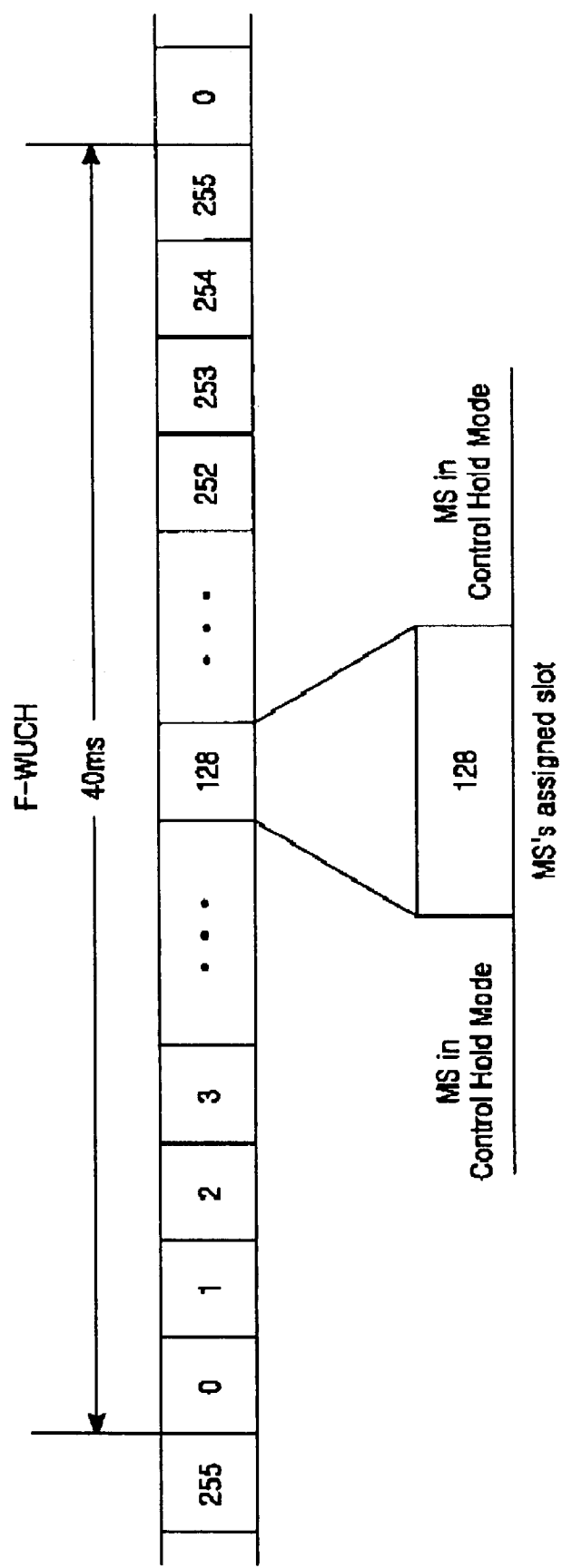
FIG. 7 illustrates a structure of F-WUCH transmitting a single indicator bit according to a first embodiment of the present invention.

FIG. 7 illustrates a structure of F-WUCH transmitting a single indicator bit according to a first embodiment of the present invention. Referring to FIG. 7, F-WUCH periodically transmits 40 ms frames each having 256 slots. Each slot has a length of 0.15625 ms, and a particular slot (e.g., a slot with a slot index 128) in each frame is assigned to a particular mobile station. The mobile station in a sleep mode wakes up at the assigned slot to detect an indicator bit, and then returns to the sleep mode if the bit indicates no data. Since the indicator bit has a very short length compared with an F-PDCCH message, a time period where the mobile station wakes up to detect the indicator bit is very short, so that the time period is negligible in terms of power consumption. If the indicator bit does not indicate an instruction for monitoring the F-PDCCH, the mobile station maintains the sleep mode until the assigned slot of the next frame.

Figure 8:
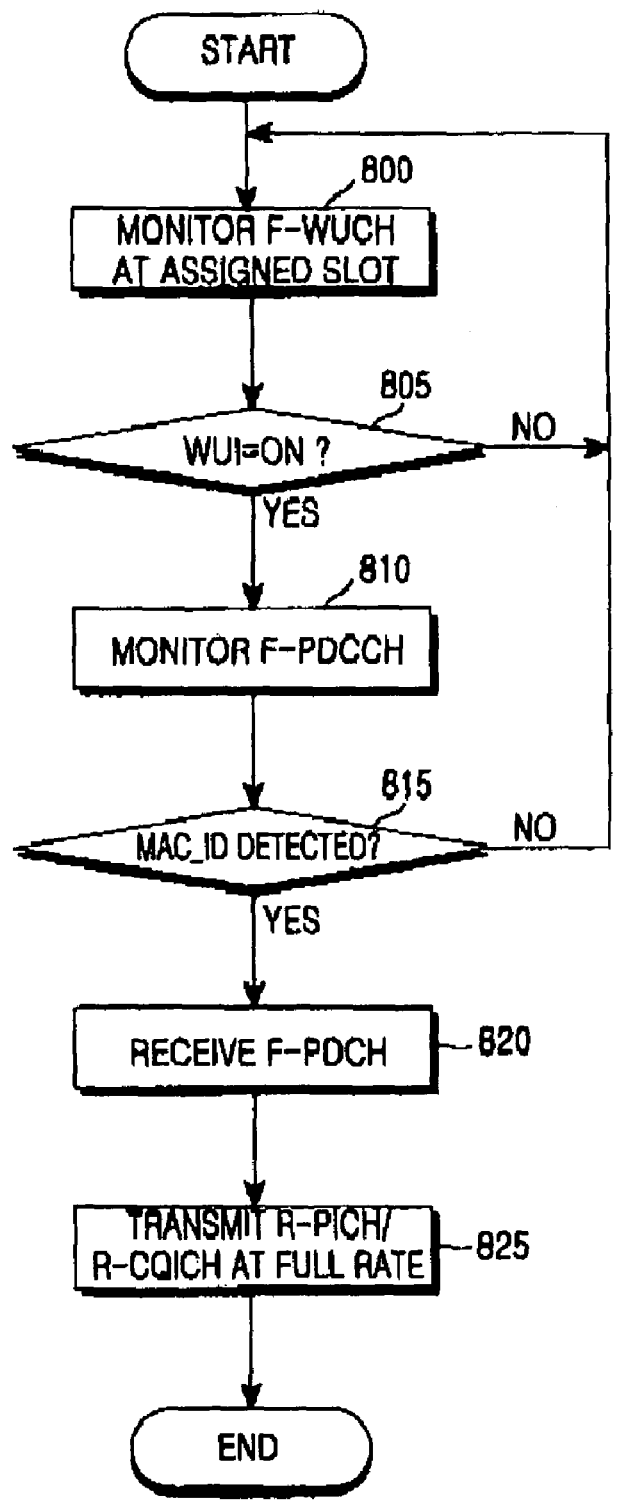
FIG. 8 is a flowchart illustrating an operation of transitioning by a mobile station from a control hold mode to an active mode using a single indicator bit according to the first embodiment of the present invention.

FIG. 8 is a flowchart illustrating an operation of transitioning by a mobile station from a control hold mode to an active mode using a single indicator bit according to the first embodiment of the present invention. Referring to FIG. 8, in a control hold mode, a mobile station maintaining a sleep mode wakes up at a slot assigned thereto, and detects an indicator bit WUI at the assigned slot on F-WUCH, in step 800. The mobile station determines in step 805 whether the detected indicator bit has an "ON" value. If the indicator bit detected at the slot assigned thereto has an "ON" value, the mobile station monitors the F-PDCCH in step 810, and determines in step 815 whether its MAC_ID is detected from the F-PDCCH. Otherwise, if the detected indicator bit has an "OFF" value, the mobile station returns to step 800, judging that there is no data to be transmitted from a base station to the mobile station, and maintains the sleep mode until the next assigned slot. If its MAC_ID is detected in step 815, the mobile station transitions, in step 820, to an active mode, decodes data received from the base station over F-PDCH, performs error detection on the decoded data, and feeds back HARQ (Hybrid Automatic Retransmission Request) ACK/NACK as the error detection result (as also shown in FIG. 6), to the base station. In step 825, the mobile station transmits R-PICH and R-CQICH at a full rate.

Figure 9:
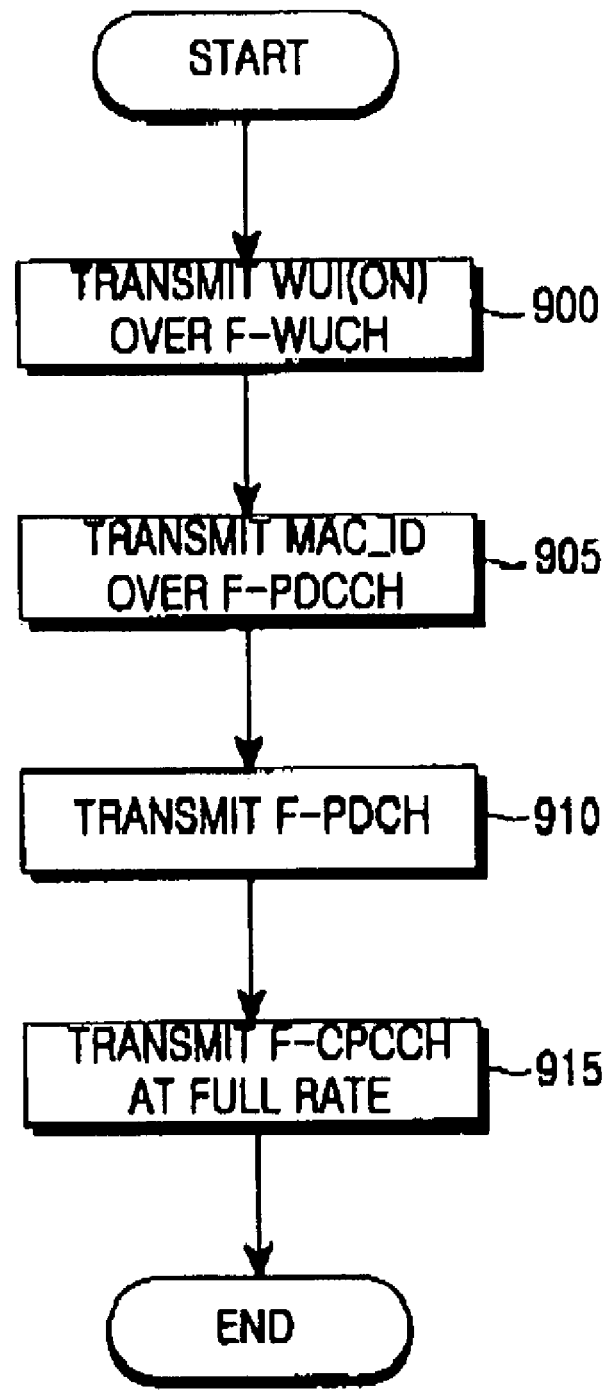
FIG. 9 is a flowchart illustrating an operation of transitioning by a base station from a control hold mode to an active mode using a single indicator bit according to the first embodiment of the present invention.

FIG. 9 is a flowchart illustrating an operation of transitioning by a base station from a control hold mode to an active mode using a single indicator bit according to the first embodiment of the present invention. Referring to FIG. 9, if there is data to transmit to a mobile station, a base station in a control hold mode sets a value of an indicator bit transmitted over an F-WUCH slot assigned to the mobile station to "ON," in step 900, and transmits MAC_ID of the mobile station over F-PDCCH in step 905. Thereafter, in step 910, the base station transitions to an active mode and starts transmitting packet data over F-PDCH. In step 915, the base station transmits F-CPCCH at a full rate.

Figure 10:
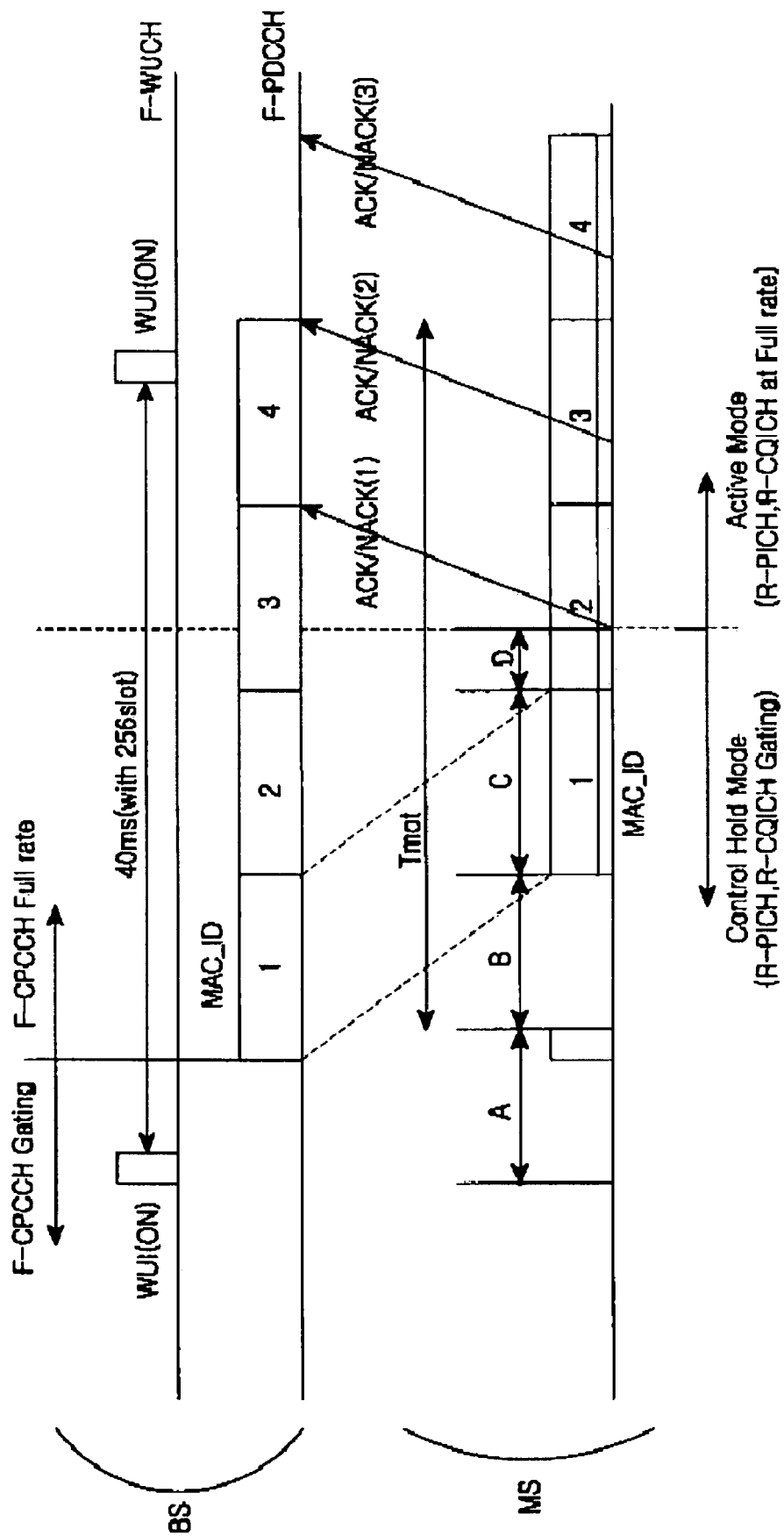
FIG. 10 illustrates an operation of continuously transmitting packets by a mobile station and a base station according to the first embodiment of the present invention.

FIG. 10 illustrates an operation of continuously transmitting packets by a mobile station and a base station according to the first embodiment of the present invention. In the current 1xEV-DV system, 2-bit WUI can be used to perform continuous packet transmission between a base station and a mobile station, and FIG. 10 illustrates an example of such a packet transmission method. In FIG. 10, the mobile station and the base station can perform the following two different operations.

First, if continuous transmission of packet data, initiated by an indicator bit of a first frame on F-WUCH, is terminated before the next indicator bit of a second frame is transmitted, then the base station sets the indicator bit of the first frame to "ON(1)" and the indicator bit of the second frame to "OFF(0)." As a result, monitoring on the F-PDCCH, initiated by the indicator bit of the first frame, is terminated by the indicator bit of the second frame. Therefore, upon receiving the indicator bit of the first frame, the mobile station monitors the F-PDCCH for at least 40 ms.

Second, if continuous transmission of packet data, initiated by an indicator bit of a first frame on F-WUCH, is terminated after the next indicator bit of a second frame is transmitted, then the base station sets both the indicator bit of the first frame and the indicator bit of the second frame to "ON(1)" (as shown in FIG. 10). As a result, the mobile station continuously monitors the F-PDCCH by the indicator bits.

Next, a description will be made of a second embodiment where the indicator WUI transmitted over F-WUCH is comprised of two indicator bits.

Figure 11:
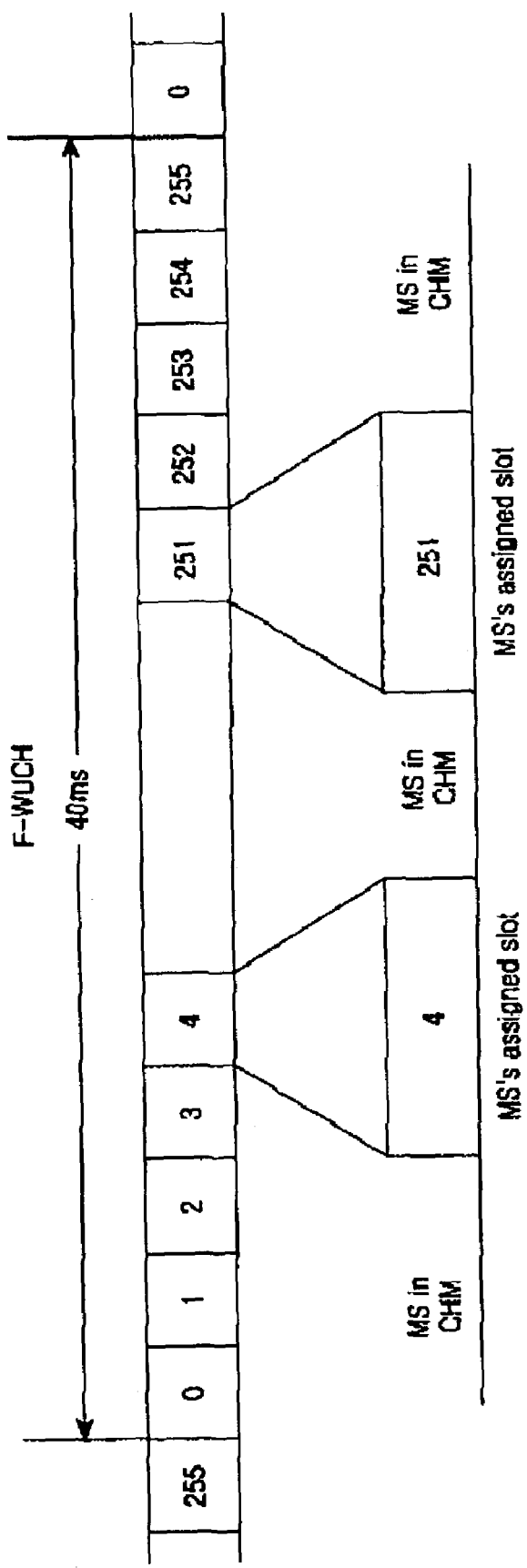
FIG. 11 illustrates a structure of F-WUCH transmitting two indicator bits according to a second embodiment of the present invention.

FIG. 11 illustrates a structure of F-WUCH transmitting two indicator bits according to a second embodiment of the present invention. Referring to FIG. 11, as described in conjunction with FIG. 7, F-WUCH periodically transmits 40 ms frames each having 256 slots. Here, particular slots (e.g., slots with slot indexes 4 and 252) in each frame are assigned to a particular mobile station. The two slots each transmit one indicator bit, and a mode transition condition of a mobile station based on the two indicator bits is illustrated in FIG. 12.

Figure 12:
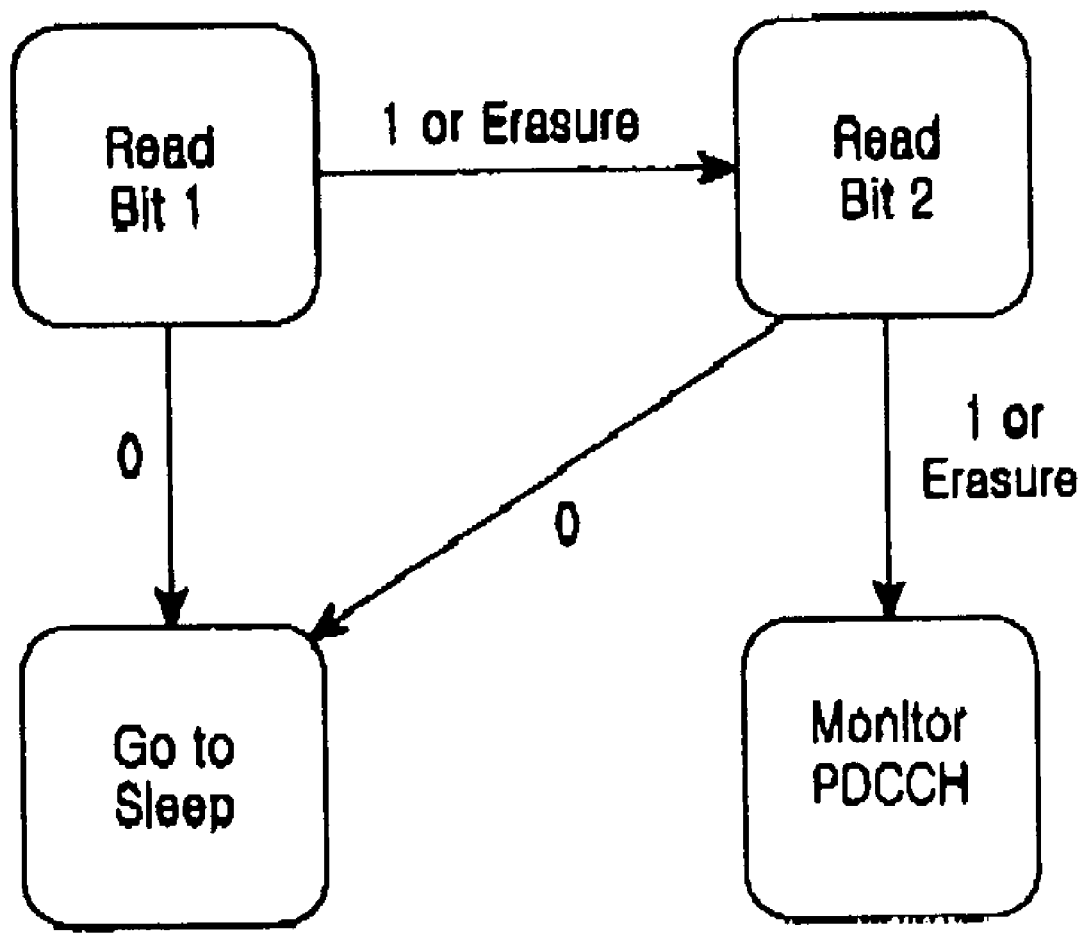
FIG. 12 illustrates mode transition of a mobile station based on the two indicator bits.

Referring to FIG. 12, a mobile station in a sleep mode wakes up at a first assigned slot on each frame and detects a first indicator bit. If the detected first indicator bit is "0(OFF)," the mobile station maintains the sleep mode until a first assigned slot on the next frame. Otherwise, if the detected first indicator bit is "1(ON)" or Erasure (indicating that a value of the indicator bit is erased), the mobile station detects a second indicator bit at a second assigned slot on the current frame. If the detected second indicator bit is "0(OFF)," the mobile station maintains the sleep mode until a first assigned slot on the next frame. Otherwise, if the detected second indicator bit is "1(ON)" or Erasure, the mobile station wakes up, and monitors F-PDCCH. As a result of the F-PDCCH monitoring, if its MAC-ID is not detected from the F-PDCCH, the mobile station returns to the sleep mode.

Figure 13:
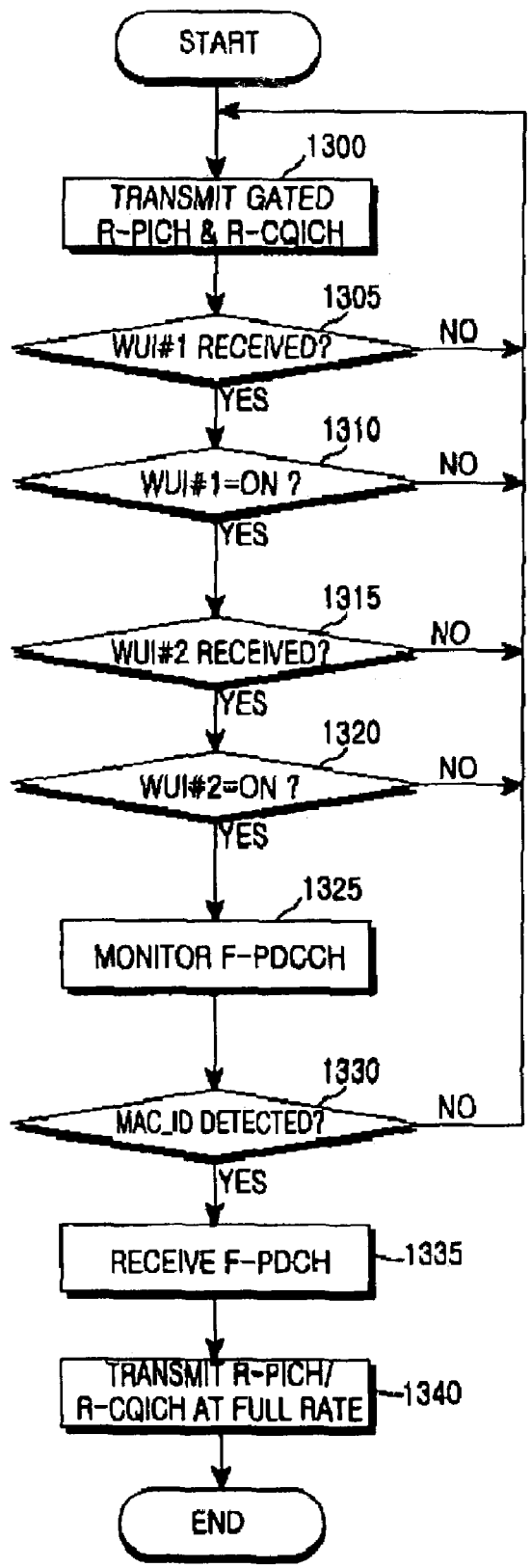
FIG. 13 is a flowchart illustrating an operation of transitioning by a mobile station from a control hold mode to an active mode using two indicator bits according to the second embodiment of the present invention.

FIG. 13 is a flowchart illustrating an operation of transitioning by a mobile station from a control hold mode to an active mode using two indicator bits according to the second embodiment of the present invention. Referring to FIG. 13, in a control hold mode, a mobile station intermittently transmits, in step 1300, R-PICH and R-CQICH on a reverse link while maintaining a sleep mode of a forward link. In step 1305, the mobile station, if it arrives at a slot assigned thereto, detects a first indicator bit WUI#1 at a first assigned slot on F-WUCH, and analyzes in step 1310 the detected first indicator bit WUI#1. If it is not possible to detect the first indicator bit or the detected first indicator bit is not "ON," the mobile station returns to step 1300. Otherwise, if the detected first indicator bit is "ON," the mobile station detects in step 1315 a second indicator bit WUI#2 at a second assigned slot on the F-WUCH, and analyzes the detected second indicator bit in step 1320. If it is not possible to detect the second indicator bit or the detected second indicator bit is not "ON," the mobile station returns to step 1300. Otherwise, if the detected second indicator bit is also "ON," the mobile station monitors F-PDCCH in step 1325, and determines in step 1330 whether its MAC_ID is detected from the F-PDCCH. If its MAC_ID is detected in step 1330, the mobile station transitions, in step 1335, to an active mode, decodes data received from a base station over F-PDCH, performs error detection on the decoded data, and feeds back ACK/NACK as the error detection result, to the base station. In step 1340, the mobile station transmits R-PICH and R-CQICH at a full rate.

Figure 14:
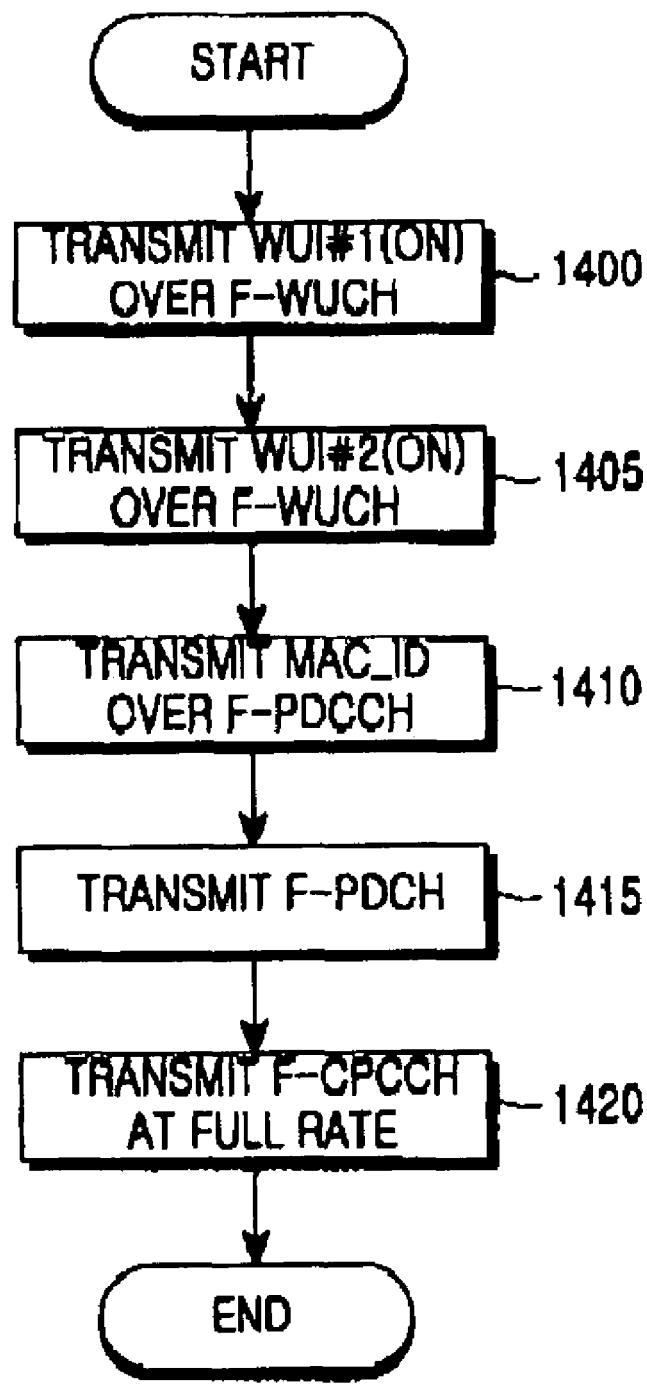
FIG. 14 is a flowchart illustrating an operation of transitioning by a base station from a control hold mode to an active mode using two indicator bits according to the second embodiment of the present invention.

FIG. 14 is a flowchart illustrating an operation of transitioning by a base station from a control hold mode to an active mode using two indicator bits according to the second embodiment of the present invention. Referring to FIG. 14, if there is data to transmit to a mobile station while intermittently transmitting F-CPCCH, a base station in a control hold mode sets a value of a first indicator bit WUI#1 transmitted over a first F-WUCH slot assigned to the mobile station to "ON," in step 1400, and sets a value of a second indicator bit WUI#2 transmitted over a second F-WUCH slot assigned to the mobile station to "ON," in step 1405. Thereafter, in step 1410, the base station transmits MAC_ID of the mobile station over F-PDCCH. In step 1415, the base station transitions to an active mode and starts transmitting packet data over F-PDCH. In step 1420, the base station transmits F-CPCCH at a full rate.

Next, a description will be made of a method for assigning F-WUCH slots that a mobile station should monitor to wake up. This method scatters the slots in order to minimize mutual interference due to indicator information transmitted from a base station to a mobile station in service. There are several methods of assigning slots for transmitting the indicator information. The present invention provides a first method using a hashing algorithm which uses a unique index of a mobile station as a hash key, and a second method using a control message.

First, a description will be made of the first method for transmitting indicator information. Every mobile station registered in a mobile communication system has several kinds of its own unique ID used for its identification. These IDs include 32-bit IMSI (International Mobile Station Identification), which is typically used as an ID of a mobile station. Herein, $0^{th}$ to $15^{th}$ bits of the 32-bit IMSI will be defined as lower bits, and $16^{th}$ to $31^{st}$ bits will be defined as higher bits.

If the indicator information is comprised of two indicator bits R1 and R2 according to the second embodiment of the present invention, positions of slots where the indicator information is carried in a frame are calculated by $$R1 = N(40503(L \cdot H \cdot DECORR1) \bmod 2^{16})/2^{16}$$

$$R2 = ((1-(2R1)/(N+X))(N+X)/2 + (2R1)(N+X)((N+X)/2 - X)((40503(L \cdot H \cdot DECORR2)) \bmod 2^{16})/2^{16} + N + X + (2R1)(N+X)((N+X)/2) \quad \text{Equation (1)}$$

In Equation (1), X represents a value which is determined according to a transmission characteristic, typically a data rate of F-WUCH. X becomes 4 for a data rate 4.8 Kbps of the F-WUCH, and becomes 8 for a data rate 9.6 Kbps of the F-WUCH. Like X, N also represents a value which is determined according to a data rate of the F-WUCH. N becomes 384 for a data rate 9.6 Kbps, and 192 for a data rate 4.8 Kbps. In addition, DECORR1 and DECORR2 are defined as $$DECORR1 = (t/64) \bmod 2^{16}$$

$$DECORR2 = (t/64+1) \bmod 2^{16} \quad \text{Equation (2)}$$

In Equation (2), t represents a system time in terms of slot
Next, a description will be made of the second method for transmitting indicator information. The IS-2000 standard defines ERM (Extended Release Message), ERMM (Extended Release Mini Message), and UHDM (Universal Handoff Direction Message) for releasing a packet data channel and transitioning to a control hold mode. Therefore, a field for notifying a mobile station of slot information assigned to the F-WUCH is added to one of the messages stated above.

Table 1 illustrates a format of ERM proposed according to the present invention.

TABLE 1

| Information Field | Length (bits) |
|---|---|
| USE_TIME | 1 |
| ACTION_TIME | 0 or 6 |
| CH_IND | 3 |
| GATING_RATE_INCL | 1 |
| PILOT_GATING_RATE | 0 or 2 |
| WUCH_ID | 0 or 2 |
| WUSCH_ID | 0 or 4 |

Shown in Table 1 is a format of ERM to which WUCH_ID (Wake-Up channel ID) and WUSCH_ID (Wake-Up Sub-Channel ID) fields defined in the IS-2000 standard are added. The WUCH_ID indicates information on a wake-up channel assigned to a mobile station receiving the message, and the WUSCH_ID indicates information on a slot, assigned to the mobile station, within the wake-up channel. The two fields are used only when the GATING_RATE_INCL field value is set to "1." If the GATING_RATE_INCL field value is set to "1," the mobile station in a control hold mode intermittently transmits a reverse pilot at a gating rate specified in the PILOT_GATING_RATE field and periodically monitors a slot of a wake-up channel designated by the WUCH_ID and WUSCH_ID fields.

The ERM illustrated in Table 1 can designate 4 wake-up channels (with 2-bit WUCH_ID) and 16 slots for each wake-up channel (with 4-bit WUSCH_ID). If the indicator information is comprised of a single indicator bit, only one slot is assigned to each mobile station. Therefore, the ERM can accommodate a maximum of 64 mobile stations in a control hold mode. A length (or the number of bits) of the WUCH_ID can be changed according to the number of mobile stations in a control hold mode, which are accommodated by the system. In addition, a length of the WUSCH_ID can also be changed according to the number of assignable slots on one wake-up channel. For example, if a length of the WUSCH_ID is 3 bits, one wake-up channel can accommodate 8 mobile stations in a control hold mode. The maximum number, $N_{MAX}$, of mobile stations in a control hold mode, which can be accommodated, can be calculated by $$N_{MAX} = N_{WUCH} * N_{SLOT} \quad \text{Equation (3)}$$

In Equation (3), $N_{WUCH}$ represents the number of wake-up channels, and $N_{SLOT}$ represents the number of assigned slots per wake-up channel. Here, $N_{WUCH}$ is identical to $2^{(length\ of\ WUCH\_ID)}$, and $N_{SLOT}$ is identical to $2^{(length\ of\ WUSCH\_ID)}$.

Alternatively, it is also possible to designate the slots that a mobile station must monitor in a control hold mode, by adding the WUCH_ID and WUSCH_ID fields to another message of ERMM or UHDM. As another example, it is also possible to use another message including the WUCH_ID and WUSCH_ID fields. Such a message can be transmitted over a dedicated control channel or a common control channel transmitted from a base station to a mobile station. When the message is transmitted over the common control channel, an additional field for indicating a destination mobile station is used.

As described above, the present invention has the following advantages. The present invention can minimize power consumption of a mobile station which makes a transition to a control hold mode in a data non-transmission period, and save radio resources of a base station, which are used to instruct the mobile station to make a transition from the control hold mode to an active mode. In addition, the base station and the mobile station can be rapidly synchronized before transition to the active mode.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for determining, by a mobile station, whether a base station has data to transmit during a data service, where the mobile station is in a control hold mode in a data non-transmission period, and returns to an active mode in a data transmission period, the method comprising the steps of:
   receiving a control message designating at least one time slot on a forward wake-up channel, assigned to the mobile station in the control hold mode, from the base station during call setup for the data service, wherein the control message includes an information field for indicating the forward wake-up channel among a plurality of forward channels and an information field for indicating a position of the assigned slot on the forward wake-up channel,
   detecting at least one predetermined indicator bit over the time slot on the forward wake-up channel;
   monitoring a control channel from the base station in order to determine whether to transit to the active mode if the at least one indicator bit indicates that the base station has data to transmit; and
   returning to the active mode in order to receive data from the base station if a unique ID (Identification) of the mobile station is detected from the monitored control channel.

2. The method of claim 1, further comprising the step of maintaining the control hold mode until a next assigned slot arrives, if the at least one indicator bit indicates that the base station has no data to transmit.

3. The method of claim 1, wherein the assigned slot is designated according to a unique index of the mobile station during call setup for the data service.

4. The method of claim 3, wherein a position of the assigned slot is designated by performing a hashing algorithm using the unique index of the mobile station as a hash key.

5. The method of claim 1, wherein the mobile station in the control hold mode intermittently transmits a reverse pilot signal and a reverse channel quality indicator signal to the base station.

6. The method of claim 1, wherein the mobile station in the active mode transmits a reverse pilot signal and a reverse channel quality indicator signal to the base station at a full rate.

7. The method of claim 1, wherein the step of monitoring the control channel comprises the steps of:
   detecting a first indicator bit at a first slot on the forward wake-up channel, assigned to the mobile station;
   determining whether the first indicator bit indicates erasure of a value of the first indicator bit or indicates that the base station has data to transmit;
   detecting a second indicator bit at a second slot on the forward wake-up channel, assigned to the mobile station if the first indicator bit indicates erasure of a value of the first indicator bit or indicates that the base station has data to transmit; and
   monitoring the control channel if the second indicator bit indicates erasure of a value of the second indicator bit or indicates that the base station has data to transmit.

8. A method for returning to an active mode to resume data transmission, by a base station in a control hold mode in a data non-transmission period where the base station transmits no data to a mobile station during a data service, the method comprising the steps of:
   transmitting a control message designating at least one time slot on a forward wake-up channel, assigned to the mobile station in the control hold mode, to the mobile station during call setup for the data service, wherein the control message includes an information field for indicating the forward wake-up channel among a plurality of forward channels and an information field for indicating a position of the assigned slot on the forward wake-up channel,
   setting at least one indicator bit on the forward wake-up channel, transmitted over the time slot, to a value indicating that the base station has data to transmit if there is data to transmit to the mobile station; and
   transmitting the indicator bit indicating that the base station has data to transmit, and then transmitting a unique ID (Identification) of the mobile station over a forward packet data control channel to the mobile station.

9. The method of claim 8, wherein the assigned slot is designated according to a unique index of the mobile station during call setup for the data service.

10. The method of claim 9, wherein a position of the assigned slot is designated by performing a hashing algorithm using the unique index of the mobile station as a hash key.

11. The method of claim 8, wherein the base station in the control hold mode intermittently transmits a forward power control channel to the mobile station.

12. The method of claim 8, wherein the base station in the active mode transmits a forward power control channel to the mobile station at a full rate.

* * * * *